United States Patent [19]
Zink

[11] 4,453,607
[45] Jun. 12, 1984

[54] WEIGHT SCALE WITH SIDE LOAD PROTECTION
[75] Inventor: Frederick J. Zink, Redford, Mich.
[73] Assignee: GSE, Inc., Farmington Hills, Mich.
[21] Appl. No.: 409,240
[22] Filed: Aug. 18, 1982
[51] Int. Cl.³ .................... G01G 21/02; G01G 3/14
[52] U.S. Cl. ................................ 177/179; 177/187; 177/211
[58] Field of Search ............... 177/179, 180, 187, 211
[56] References Cited
U.S. PATENT DOCUMENTS
4,258,810 3/1981 Susor .................................. 177/128
4,258,814 3/1981 Dillon ............................. 177/211 X
4,285,412 8/1981 Wirth ................................. 177/179

Primary Examiner—George H. Miller, Jr.
Attorney, Agent, or Firm—Krass and Young

[57] ABSTRACT

The base of a weigh scale includes openings in the bottom thereof at each corner. The base is raised above a supporting surface by way of rigid foot members aligned with the openings in the corners of the base. Load cells in the form of deflection beams each having one of their ends fixed to the base while their other end contacts upper surfaces of their respective foot members. Damage to the load cells by side shock loads is eliminated by way of resilient coupling members connected between the foot members and the base.

6 Claims, 6 Drawing Figures

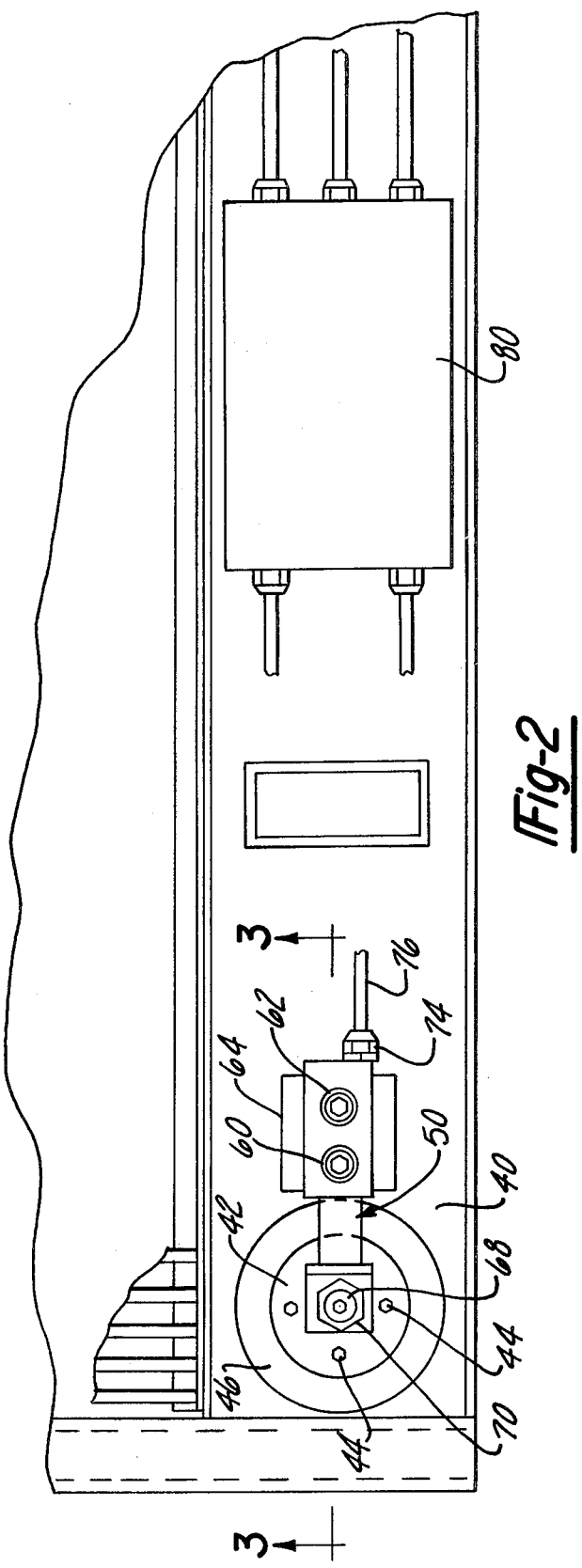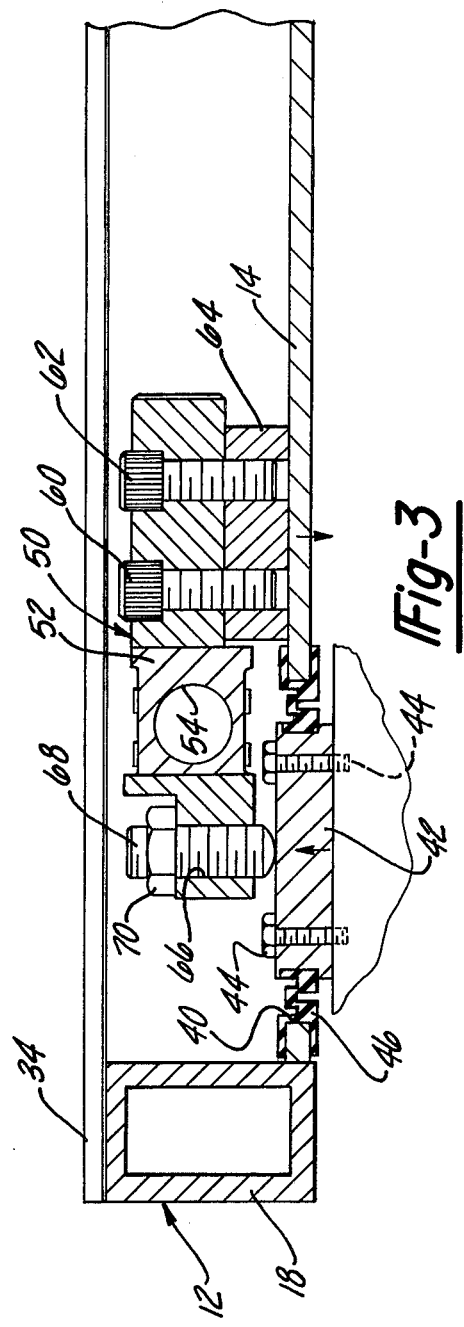

WEIGHT SCALE WITH SIDE LOAD PROTECTION

DESCRIPTION

1. Technical Field

This invention relates to weigh scales and, more particularly, to weigh scales employing load cells for making weight measurements.

2. Background Art

Weigh scales employing platforms or "weigh bridges" connected to load cells are well known in the art. Many of these types of scales are adapted to be used on the floor of a plant to weigh various heavy objects, often exceeding 500 pounds. Consequently, it is highly desirable to maintain the height of the weighing apparatus as small as possible to minimize the amount of lifting necessary to place the objects onto the weighing platform. Sometimes, forklift trucks or the like are actually driven onto the weighing platform over a ramp. In such istances the length of the ramp for driving the vehicle onto the platform may be reduced by providing the weigh scale with a low profile.

U.S. Pat. Nos. 4,258,810 to Susor and 4,258,814 to Dillon disclose low profile weigh scales and associated load cells for the use in their constructions. These constructions employ load cells in the four corners of a frame. Each of the load cells have a downwardly facing recess in which a floating pin is received. The pin has a relatively large base which engages the floor and includes an upwardly projecting mounting section which extends into the recess of the load cell. The base of the floating pin is movable along the floor for the purpose, as stated in these patents, of compensating for shifting movements of the platform relative to the supporting surface due to thermal expansion and other causes.

When scales of this type rest on the floor of a plant it is possible for the entire weigh scale to be slid across the floor as a result of side loads on the scale due to such things as a forklift accidentally bumping into it and the like. Since most plant floors are not perfectly level, the sliding motion of the scale may result in it becoming nonlevel. This, of course, would effect the accuracy of the measurement. If the pins of the aforementioned patents were rigidly fixed to the floor, these side loads may cause damage to the sensitive load cells.

It sometimes becomes necessary to move these weigh scales to different plant locations. Heretofore, it was difficult for one person to manually move the scales without some mechanized assistance such as hoists and the like. The '814 patent discloses a single piece platform covering all of the internally mounted load cells. Platforms of these types are generally made of relatively thick metal to accomodate the heavy loads. Consequently, these heavy one piece platforms must be removed in order to obtain access to the load cells within the confines of the interior portions of the frame. Access to the load cells are often necessary for such things as repair, replacement or leveling purposes. Those skilled in the art will appreciate that easy access to the load cells in construction such as that disclosed in the above patent is not readily obtainable.

SUMMARY OF THE INVENTION

Pursuant to the present invention the weigh scale is adapted to be fixed to its supporting surface such as a floor of a manufacturing plant. A base for the scale has a plurality of openings therein at spaced locations about the perimeter of its lower portions. Foot members are aligned with the openings in the base and are adapted to be fixed to the supporting surface to raise the base above it. At least one load cell such as a strain gauged beam is fixed at one end to the base and the other end rests on upper portions of one of the foot members. A resilient coupling member is connected between the foot member and the base. The resilient coupling member operates to protect the sensitive beam from potentially damaging side shock loads and also serves as a self centering mechanism. In the preferred embodiment, the coupling member takes the form of a rubber diaphragm.

BRIEF DESCRIPTION OF THE DRAWINGS

These and other advantages of the present invention will become apparent to one skilled in the art after reading the following specification and by reference to the drawings in which:

FIG. 2 is a top plan view of a corner of the scales with the covers removed;

FIG. 3 is a cross-sectional view along the lines 3—3 of FIG. 2;

DESCRIPTION OF THE PREFERRED EMBODIMENT

Figure 1:
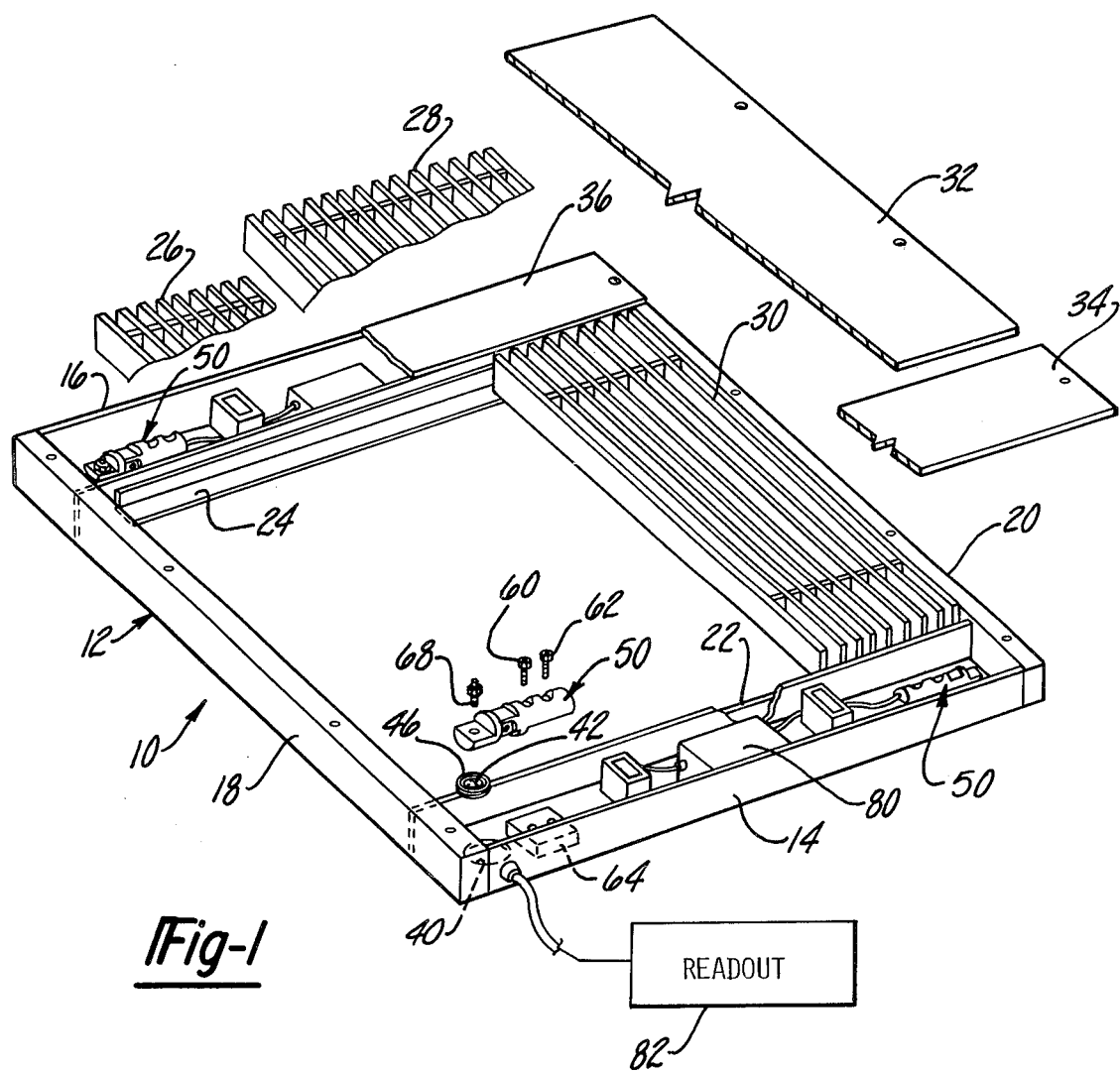
FIG. 1 is an exploded perspective view of a weigh scale made in accordance with the preferred embodiment of this invention.

Turning now to the drawings, especially FIGS. 1–3, the weigh scale 10 of the preferred embodiment employs a generally rectangular frame broadly designated by the numeral 12. Two opposite sides of frame 12 are constructed of upwardly extending U-shaped steel channel members 14 and 16. End rails 18 and 20 are fixed to the ends of the channel members 14 and 16 to provide a rigid structure, Angle irons 22 and 24 are welded to mutually facing interior sides of channel members 14 and 16, respectively. Angle irons 22 and 24 provide horizontally extending lip portions spaced from the bottom of frame 12 for supporting metal gratings 26, 28 and 30 which bridge the otherwise empty central portions of frame 12. The individual gratings are of such a construction that they may be manually lifted easily by a single person.

A rigid metal platform 32 in the form of a tread plate lies on upper portions of the gratings and is secured at each end to rails 18 and 20 by screws. Platform 32 is also of a size and construction such that it may be easily removed from the frame 12 and manually carried to another location. Covers 34 and 36 are similarly secured to channel members 14 and 16, respectively. Thus, the interior portions of their respective channel members are protected during use but access to the internal components may be readily obtained by removing one of the covers 34, 36. Note that access to the internal components may be had while an object remains on the weighing platform 32 due to the fact that individual covers are provided.

Figure 4:
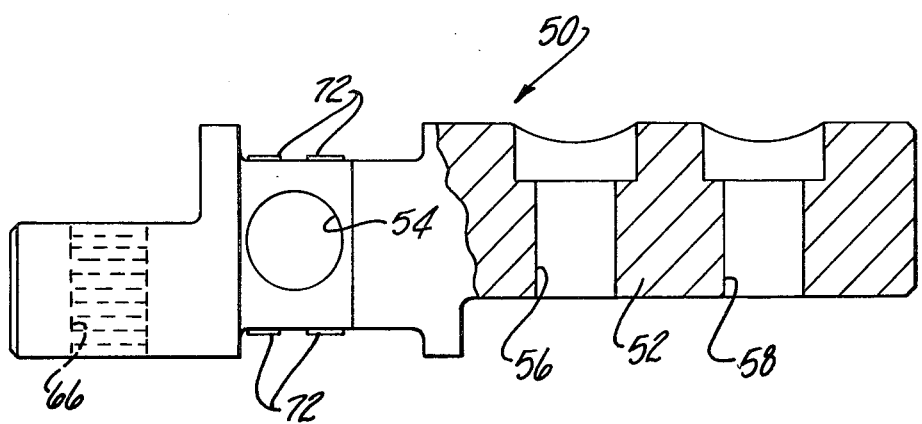
FIG. 4 is a side view with parts in cross section of a beam which may be utilized in the preferred embodiment.

FIGS. 2-4 illustrate the internal components within channel members 14 and 16 in more detail. Load sensing devices are located within the weigh scale frame 12. Each of the load sensing devices is substantially the same and thus only one shall be described in detail. The bottom of the channel members include circular openings 40 therein. Foot members 42 in the form of rigid metal annular disks are disposed within openings 40. As can be seen most clearly in FIG. 3, foot member 42 is adapted to be rigidly secured to the supporting surface for the weigh scale such as the floor of a manufacturing plant. Foot members 42 include a plurality of spaced holes therein for receiving lag bolts 44. Normally, the weigh scale is secured to the floor by drilling holes in the concrete, filling each hole with a lead molly, and then tightening down the lag bolts.

A resilient annular coupling member 46 is connected between foot member 42 and the bottom portion of channel member 14 defining opening 40. In the preferred embodiment, coupling member 46 is a neoprene rubber diaphragm. Inner peripheral portions of diaphragm 46 engages grooves in the outer peripheral surface of foot member 42. The outer portion of diaphragm 46 includes an annular groove that engages with both sides of the bottom of channel member 14. It should be noted that changing the durometer of the rubber, the cross section, and changing to a different resilient material can drastically change the spring rate of the diaphragm. In essence it is a centering spring of sorts and a number of materials could readily accomplish the same function.

This construction, as can be seen most clearly in FIG. 3, serves to raise the frame 12 of weigh scale 10 a given distance above its supporting surface. It should be appreciated that the weight of an object placed on platform 32 will result in downward forces to frame 12 and a counteracting upward force by foot member 42. These forces are measured by way of flexure beams generally designated by the numeral 50.

Flexure beam 50 is made of a solid bar 52 of metal stock in which a machined central web portion includes a transversely extending hole 54 therethrough to increase measurement sensitivity. One end of bar 52 includes vertical extending countersunk holes 56 and 58. Threaded fasteners such as screws 60, 62 are employed to secure the one beam end to an upstanding member 64 on the bottom of channel member 14. The other end of bar 52 projects parallel to the bottom of the channel member 14 into spaced vertical alignment with foot member 42. The distal end of beam bar 52 includes a vertically extending threaded hole 66. A threaded post 68 is screwed into hole 66 until its bottom portion rests on the upper surface of foot member 42. Preferably, the lower end of post 68 is spherically shaped for the purpose of minimizing the effect of any extraneous nonvertical forces on the measurement. The top end of post 68 may include a suitable socket for receiving an associated wrench or the like. A lock nut 70 is advantageously employed to secure the post 68 in place.

The central portion of the beam bar 52 has strain guages 72 mounted to it which are connected into a conventional Wheatstone bridge network. The type and location of strain guages 72 may be varied. For example, they may be alternately placed on the inner confines of hole 54. The arch beam construction disclosed in U.S. Pat. No. 4,065,962 and a shear beam having a guaged center shear web are further examples of alternative techniques that can be used. In any event, strain guages 72 serve to convert the mechanical forces associated with the object being weighed into electrical signals in a manner known in the art.

Conductors connected to strain gauges 72 may pass through a horizontally extending hole (not shown) in the fixed end of bar 52 and pass through connector 74 via cable 78 to a junction box 80. Junction box 80 may serve to connect the bridge networks of all four of the beams together and supply an associated output signal to a conventional display 82 (FIG. 1) having internal electronic circuitry for providing a visual indication of the weight of the object to be measured.

Figure 5:
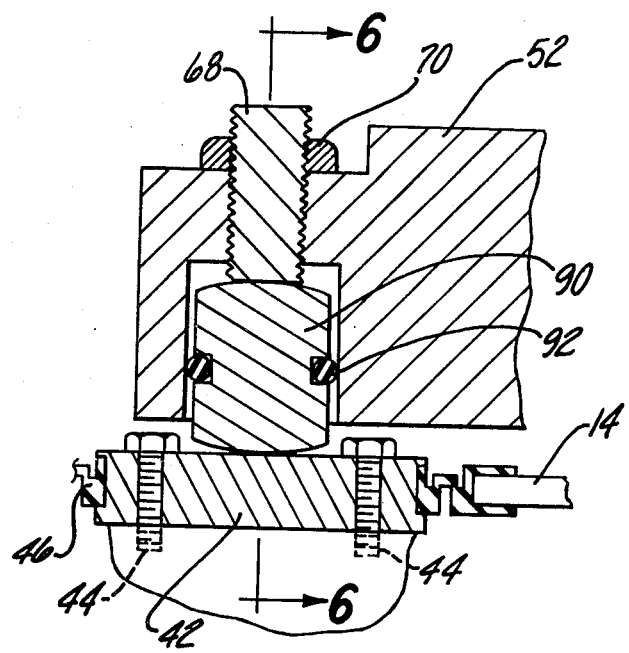
FIG. 5 is a cross-sectional side view of an alternative type of adjustment construction that may be used with the load sensing beams of the preferred embodiment.
Figure 6:
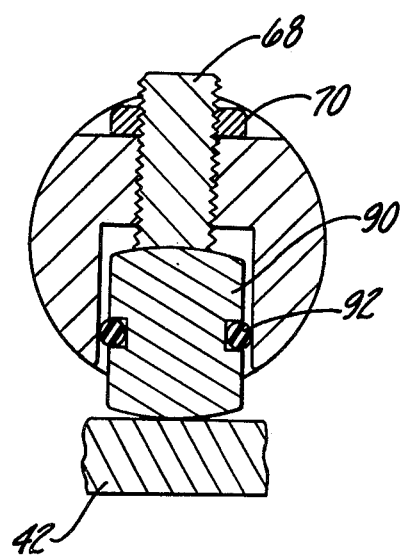
FIG. 6 is a cross-sectional view along lines 6—6 of FIG. 5.

FIGS. 5 and 6 illustrate an alternative type of height adjustment mechanism capable of a small amount of friction free side movement. In large part the components are the same as those previously described in connection with the foregoing embodiment and, therefore, the same reference numerals will be used to designate like components. In this embodiment the distal end of the beam bar includes a rocker member 90 disposed therein. A resilient O-ring 92 is used as a self-centering device between rocker 90 and bar 52. The upper and lower surfaces of rocker 90 are spherically shaped, again for the purposes of minimizing the effect of nonvertical forces on the measurement beam. Still other load measuring device constructions may be employed while keeping within the spirit of this invention.

Those skilled in the art will now appreciate the advantages provided by the unique weigh scale construction just described. The weigh scale 10 of a preferred embodiment has a large weighing capacity capable of handling objects weighing in excess of 500 pounds, yet the scale has a very low profile extending only several inches off of the supporting surface. Extremely accurate measurements may be obtained even though the individual components are rather simple, easy to manufacture and assemble. It is of a rugged construction but at the same time it can be manually moved to a different plant location by one person. This is easily accomplished by removing the covers and lifting out the individual gratings. The frame then can be moved to the next location and secured to the floor.

The beam construction enables the user to readily level the scale to account for uneveness of the floor. The user merely loosens lock nut 70 and backs off or tightens post 68 until its lower end comes into contact with its associated foot member 42. Subsequently, leveling adjustments can be easily made after the weigh scale is reassembled merely by removing one of the channel member covers. Since all of the electronic components are contained and thereby protected by the channel members all of these components are easily accessible for initial set up, replacement, testing and other purposes.

When the foot members are secured to the floor, the scale is rigidly held in place and will not slide to another position which may cause the scale to become unbalanced due to it encountering different floor level conditions. Even though the scale may be rigidly secured to the floor, the load sensing device construction prevents damage to the sensitive flexure beams from side shock loads. A manufacturing plant typically utilizes various machines, dollies and the like in the area surrounding the scale location. If such machinery accidentally bumps into the side of the scale, the resilient coupling member 46 will absorb most of the potentially damaging force. Note, also, that the beam end is not rigidly attached to the foot member but merely rests thereon.

Consequently, it is possible for the beam to move horizontally in response to side shock loads without encountering significant flexure in the horizontal direction which may damage the beam. The resilient coupling member also serves as a self-centering mechanism to bring the contacting end of the beam back into alignment with its associated foot member after the side shock load has ceased applying forces to the scale. During initial set up, the coupling member also serves to align the foot member with its associated opening in the channel member.

Still other advantages will become apparent to one skilled in the art after a study of the drawings, specification and the following claims.

I claim:

1. A weigh scale comprising:
    a base having a bottom portion with a plurality of openings therein;
    foot members aligned with the openings in the base, adapted to be fixed to a supporting surface for the scale and raise the base a given distance above the supporting surface;
    at least one flexure beam to sense applied weight fixed at one end to the base, with the other end of the beam resting on upper portions of an adjacent foot member; and
    resilient coupling members connected between the foot members and the base bridging said openings thereby serving to minimize damage to the beam due to side shock loads introduced to the base.

2. The weigh scale of claim 1 wherein said resilient coupling members are annular rubber diaphragms.

3. The weigh scale of claim 1 wherein said foot members are generally flat disks having grooves in their sides; and
    wherein inner peripheral portions of said diaphragm engage the grooves in said disk, with the diaphragm including forked outer peripheral portions for engaging the base defining the opening.

4. The weigh scale of claim 3 wherein said other end of the beam has a horizontally projecting portion in vertical alignment with said foot disk and includes a vertically extending threaded hole therethrough; and means extending through the threaded hole for contacting upper portions of the foot disk.

5. The weigh scale of claim 3 wherein said means includes a threaded post adjustably extending through the threaded hole in the beam and contacting upper portions of the foot disk.

6. A weigh scale having a large weigh capacity comprising:
    a generally rectangular base having a bottom portion with openings in each corner;
    rigid foot members in the form of disks aligned with the openings in the base, said foot members being adapted to be secured to a support surface and raise the base above it;
    a plurality of strain guaged beams, one for each corner, said beams being fixed at their one ends to the bottom portion of the base and having another end portion projecting horizontally in vertical alignment above an adjacent foot member, said end portions of the beams having vertically threaded holes therein, and threaded posts extending through the openings adjustable in the vertical dimension to contact upper portions of the foot members; and
    rubber diaphragms coupling said foot members to the base defining said openings for protecting the beams from damage.

* * * * *